United States Patent [19]
Longsworth

[11] Patent Number: 5,457,961
[45] Date of Patent: Oct. 17, 1995

[54] CRYSOSTAT FOR VERY STABLE TEMPERATURE MAINTENANCE

[75] Inventor: Ralph C. Longsworth, Allentown, Pa.

[73] Assignee: APD Cryogenics Inc., Allentown, Pa.

[21] Appl. No.: 236,528

[22] Filed: Apr. 29, 1994

[51] Int. Cl.$^6$ .................................................. F25B 19/00
[52] U.S. Cl. .............................................. 62/51.1; 62/383
[58] Field of Search ..................................... 62/51.1, 383

[56] References Cited

U.S. PATENT DOCUMENTS

| | | | |
|---|---|---|---|
| 4,277,949 | 7/1981 | Longsworth | 62/51.1 |
| 4,986,077 | 1/1991 | Saho et al. | 62/51.1 |
| 5,251,456 | 10/1993 | Nagano et al. | 62/51.1 |

*Primary Examiner*—Ronald C. Capossela
*Attorney, Agent, or Firm*—Helfgott & Karas

[57] ABSTRACT

In a cryostat, an isothermal boundary is proximate a large plurality of devices that are being cooled. The barrier is slightly colder than the devices so that heat flux therebetween is very small. The devices are in good thermal contact with a cold plate, which is made of a high thermal conductivity material. A single heater and a temperature sensor control the temperature of the cold plate as heat flows from the cold plate to the isothermal boundary. By limiting heat flow from the cold plate, temperature gradients throughout the temperature controlled region are very small. All of the devices to be cooled are very close to the same temperature. The isothermal boundary is maintained at the desired temperature by a flow of cryogenic refrigerant and a temperature sensor on the isothermal boundary provides inputs to a controller of refrigerant flow. The cryostat is constructed to minimize the amount of energy required from the heater to maintain the temperatures, and to minimize refrigerant flow.

16 Claims, 4 Drawing Sheets

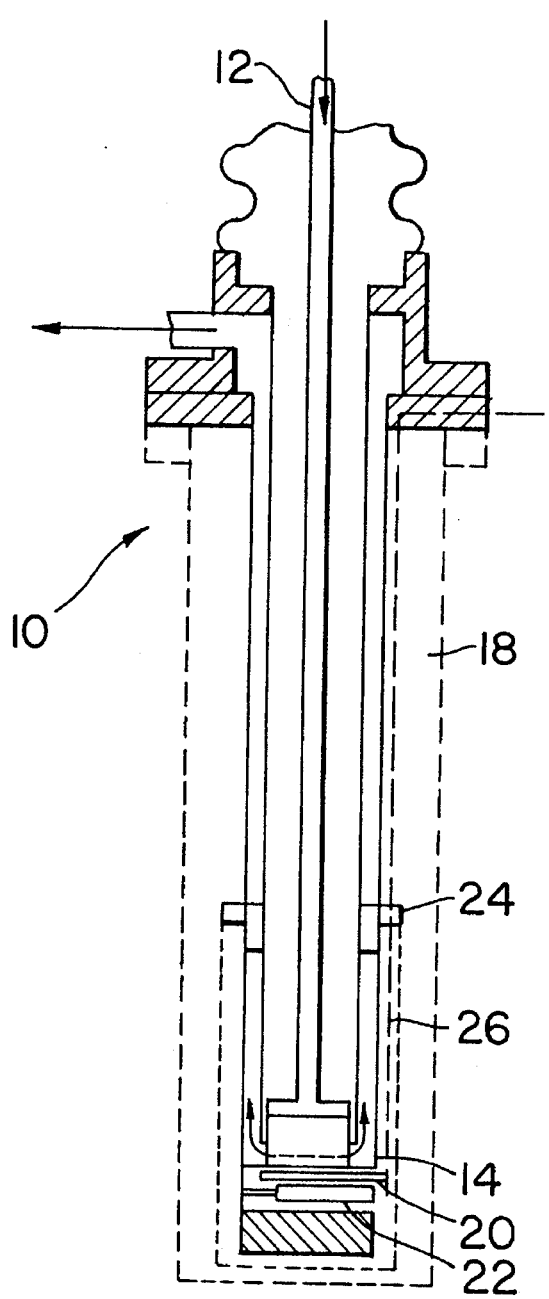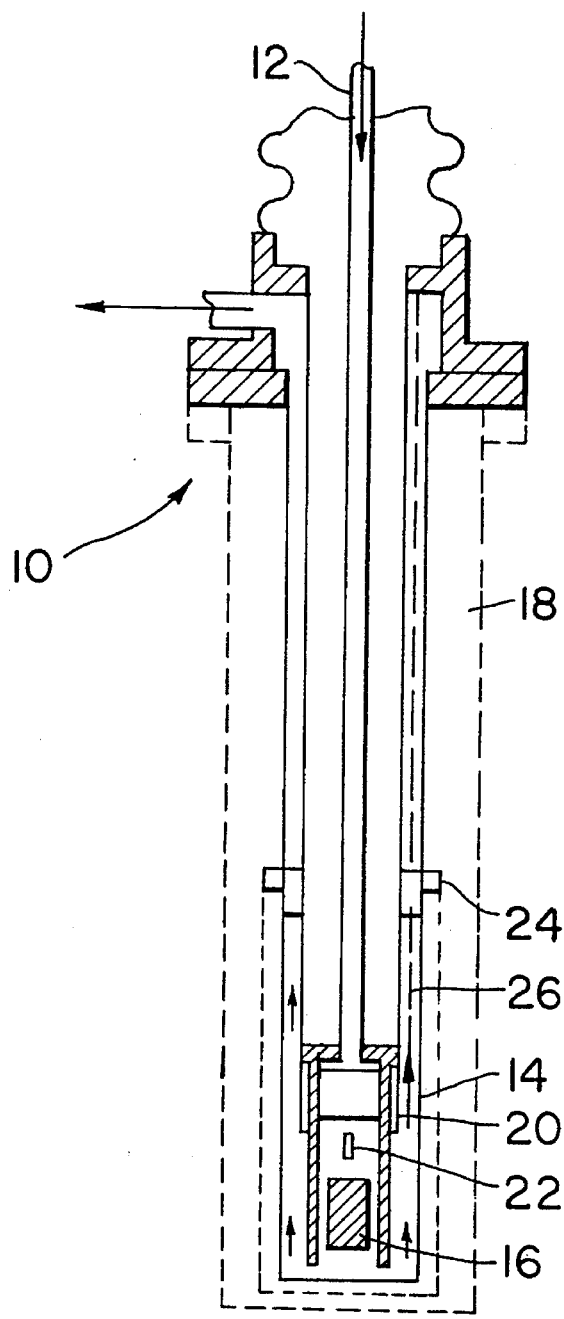
FIG. 1
(PRIOR ART)
FIG. 2
(PRIOR ART)

CRYSOSTAT FOR VERY STABLE TEMPERATURE MAINTENANCE

BACKGROUND OF THE INVENTION

In many scientific applications, there is an urgent need to cool a large plurality of sensors, or individual sensors to very low temperatures, and to maintain the sensors stable at the desired temperature over a long time period. For example, in one scientific development it was desired to include a total of 8,192 visible light photon counter detectors in a single package. It was necessary that the detectors be maintained for periods up to six months at 6.5±0.2 K. (degrees Kelvin). To achieve this objective, it was planned to contain the detectors in a single cryostat using cold helium as a temperature controlling medium. Desirably, each detector would be maintained at the same temperature.

In prior art cryostats, liquid helium is delivered to a region near the object or objects, which are being cooled. The liquid helium is then heated to the desired temperature as determined by a temperature sensor near the cooled object. The helium directly by contact or indirectly cools the object. Such a construction requires a reasonably steady flow of helium and a good automatic temperature control system. When multiple objects, e.g., detectors, are to be cooled, it is generally necessary in the prior art to have multiple temperature sensors and either a heat controller or helium flow controller, or both, at each detector to maintain steady temperatures.

What is needed is a cryostat construction that maintains multiple objects to be cooled at the same stable temperature using only a single refrigerant flow controller and a single heater and associated controller.

FIG. 1 schematically illustrates a liquid helium cooled cryostat, which is typical of a number of presently available cryostats, e.g., HELI-TRAN Model LT-3-110, manufactured by APD Cryogenics Inc. of Allentown, Pa., USA. In this prior art construction, liquid helium is delivered through a vacuum insulated transfer line 12 from a pressurized (3 PSIG) storage dewar (not shown) to a cold stage 14 within a vacuum insulated housing 18 to which a sample 16, e.g., a visible light photon counter detector, is attached. The liquid helium is delivered at a temperature of 4.2 K., its normal boiling temperature at atmospheric pressure, and the liquid is heated by a heater 20 that is positioned between the discharge from the transfer line 12 and the sample 16. Because the liquid helium is delivered from the transfer tube at 4.2 K., it is possible by adjusting the heater 20 to maintain the sample 16 at a desired higher cold stage temperature of 6.5 K. The sample 16 is maintained at the desired temperature, as measured by a temperature sensor 22, which is mounted close to the sample 16 and is used in controlling both the helium flow rate and the energy input to the heater 20.

After cooling the sample 16, it is conventional to have the cold helium flow through a second heat exchanger, that is, a thermal intercept 24, in order to cool a radiation shield 26 and to intercept heat that flows to the cold stage 14 through electrical leads and structural supports.

FIG. 2 illustrates a variation of this cooling and control method wherein similar elements have been given the same reference numerals as in FIG. 1. Helium gas leaving the transfer tube 12 at the cold stage 14 is heated by the cold stage heater 20 and flows over the sample 16 to directly cool the sample by convection and conduction. Typically, the cold helium then reverses direction and flows through a thermal intercept heat exchanger 24 to cool a radiation shield 26 in the housing 18 and to intercept heat entering the system from other sources. Such a construction is incorporated, e.g., in HELI-TRAN Model LT-3-110, mentioned above.

In another construction (FIG. 3), liquid helium is used to maintain a copper block 28 at 4.4 K. by conduction from a mass of stored liquid helium 30. As heat is transferred into the mass 30, there is a boil off of helium gas through a vent line 32 so as to intercept heat leakage toward the cold region. A sample 34, e.g., a cassette holding multiple visible light photon counter detectors, is mounted in a well 36 in the copper block 28, but the sample 34 is not in contact with the copper block 28. An electric heater and an associated temperature sensor are located adjacent to the inserted end 38 of the sample 34. Helium gas, boiled from the liquid mass 30, fills the space between the copper block and the sample 34 to transfer heat generated in the sample 34 to the copper block 28.

The sample 34 is maintained at a desired temperature that is higher than the temperature of the liquid helium. There is some heat leakage through the support structure and electrical leads toward the copper block 28. The heater at the end 38 of the sample 34 provides the balance of energy that is needed to maintain the sample at an elevated temperature, e.g., 6.5 K. The position of the sample 34 in the well 36 is adjusted to minimize the heat that must be added by means of the heater. Helium gas in the vent line 32 flows away from the sample 34 toward a discharge port (not shown) as is indicated by the arrow 39. In this flow path, heat that enters through the cryostat walls is absorbed and shielded from the sample 34 by a cooling heat exchanger 37 such that maintenance of the desired sample temperature is not significantly affected by the external ambient of the cryostat.

The construction of FIG. 3 has the disadvantages of requiring a heater, temperature sensor and temperature controller for each of the samples 34 that may be mounted in the common copper block 28. In some prior art constructions, it is also necessary to have multiple controls of helium flow rate for different portions of a multiple detector device. Also, in the prior art a significant amount of heat flows into and out of the copper block 28, which serves as a heat sink for different sources, so that temperature gradients in the copper block 28 are significant. Therefore, the temperature differential between the hottest and the coldest sample 34 in the same block 28 may be beyond limits which are tolerable in devices using a plurality of samples, e.g., detectors. Thus, it is extremely important in a construction for multiple samples that the temperature of the heat sink be held at a very uniform and constant temperature.

SUMMARY OF THE INVENTION

An object of the present invention is to provide an improved cryostat having a simplified construction for maintaining a plurality of samples at stable temperature conditions over extended time periods.

Another object of the invention is to provide an improved cryostat that maintains a plurality of samples at stable temperature conditions using a simplified control system.

Still another object of the present invention is to provide an improved cryostat for maintaining a large plurality of samples at very stable temperatures with little temperature differential between samples.

Yet another object of the present invention is to provide an improved cryostat that operates with a minimal expenditure of electrical energy and refrigerant.

In accordance with the invention, an isothermal boundary is provided around the devices that are being cooled and maintained. The isothermal barrier is only about 1 K. colder than the temperature that is desired for the devices so that the heat flux between the cooled devices and the isothermal boundary is very small. The devices that are being cooled are in good thermal contact with a cold plate or heat sink, which is made of a material having a high thermal conductivity, e.g., copper. A single heater and a temperature sensor control the temperature of the heat sink.

Thus, the devices are cooled by a good thermal relationship with the cold plate whereby heat flows from the cold plate to the isothermal boundary, which, as stated, is maintained at a temperature colder than the temperature of the cold plate. By limiting heat flow from the devices to the cold plate, the temperature gradients throughout the temperature controlled region are very small. All of the devices to be cooled are very close to the same temperature and temperature changes which do occur are generally due to changes in the temperature controller and not due to changes in the heat flux.

The isothermal boundary is maintained at the desired temperature by a flow of liquid helium to a heat exchanger that cools the isothermal boundary. The device is constructed such that a minimal amount of energy is required from the heater in order to maintain the samples at the desired temperature and accordingly, the requirements for refrigerant flow are also minimized.

Heat flow from the cold plate is minimized by maintaining the temperature of the isothermal boundary with only a small temperature difference between the boundary and the cold plate, or alternatively by having poor thermal coupling with a larger differential temperature between the isothermal boundary and the cold plate.

Because of the minimal heat transfer between the cold plate and the isothermal boundary, relatively large temperature gradients can exist within the so-called isothermal boundary and have only a small effect on the temperature gradients in the cold plate.

A temperature sensor on the isothermal boundary provides inputs to a controller of helium flow that is ultimately vented from the cryostat (and may be recycled).

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 1–3 are schematic representations of cryostats of the prior art;

DESCRIPTION OF THE PREFERRED EMBODIMENTS

Figure 3:
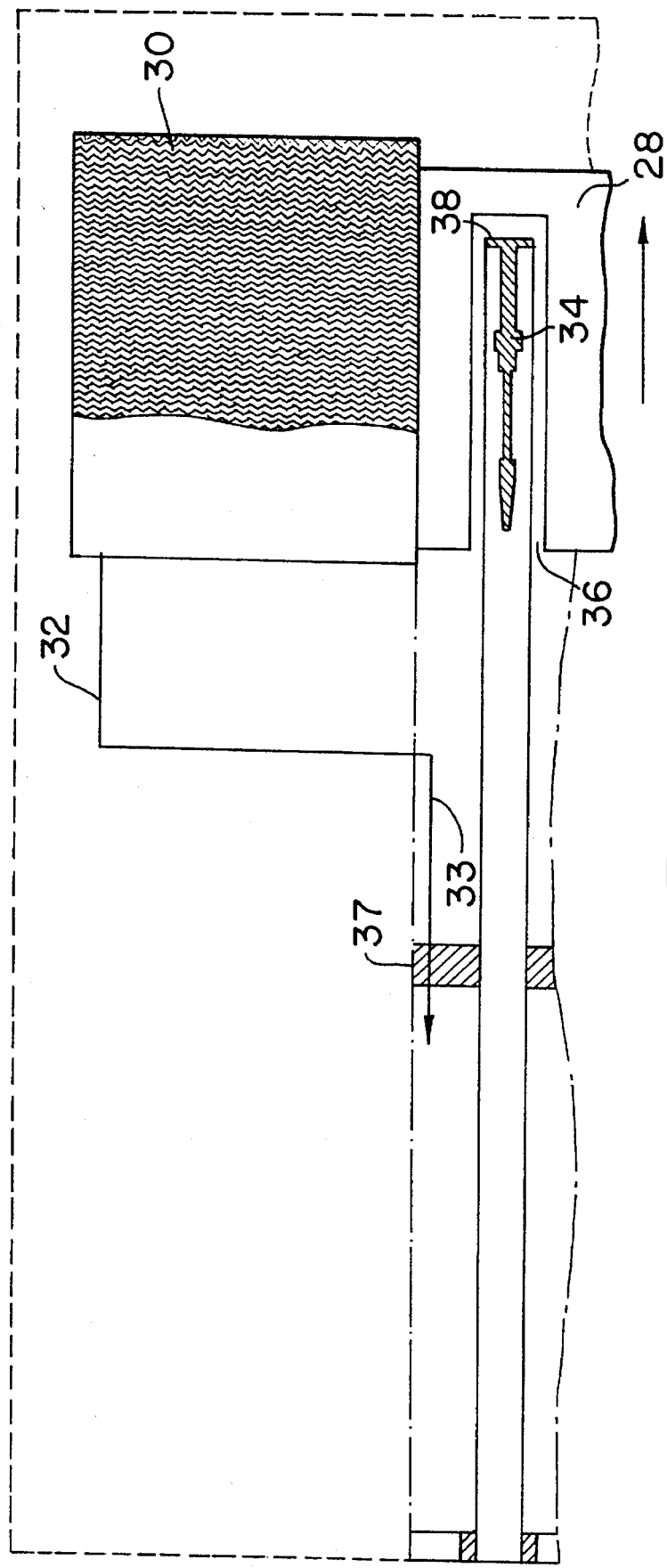
Figure 4:
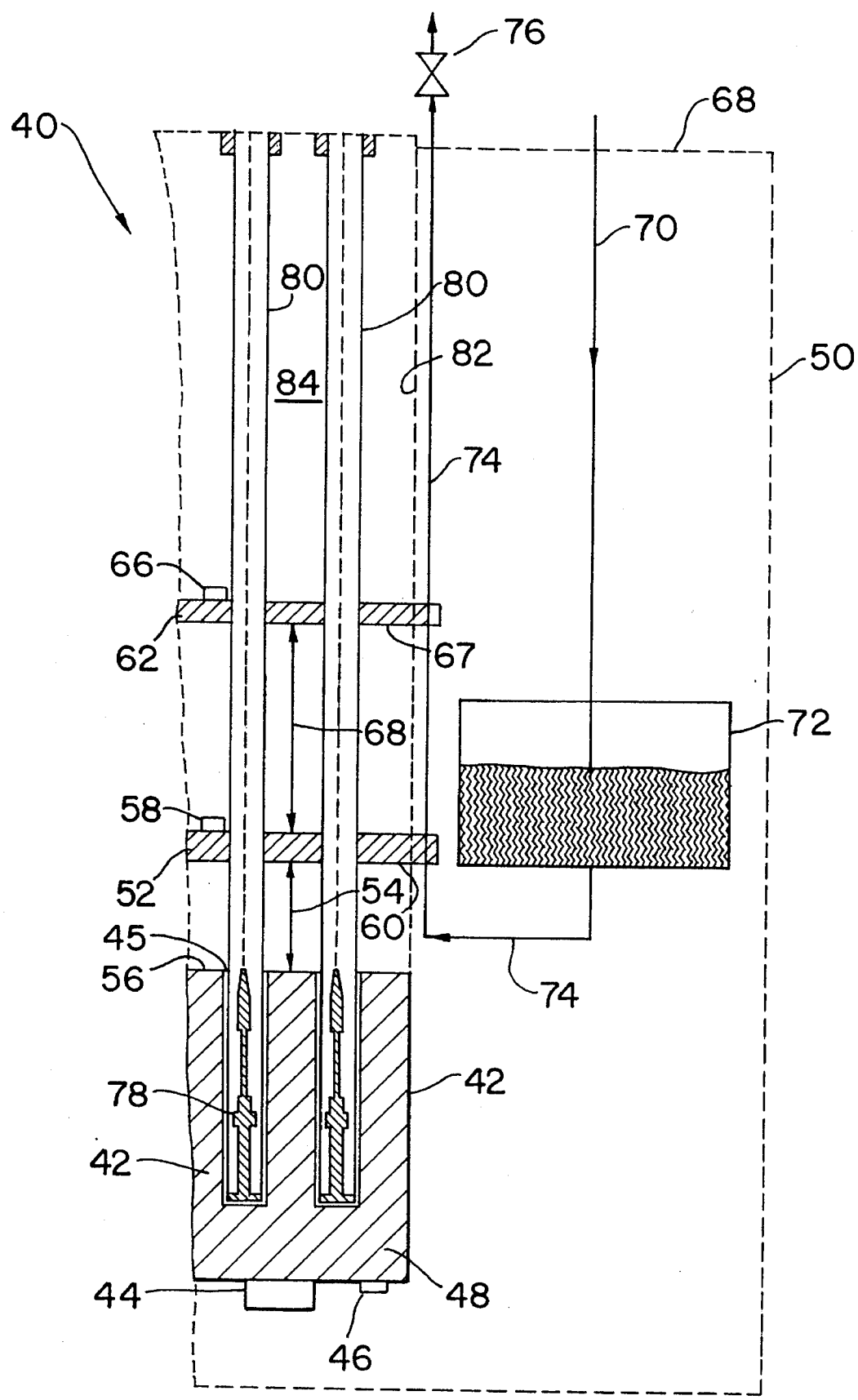
FIG. 4 is a schematic representation of a cryostat for very stable temperature maintenance in accordance with the invention.

With reference to FIG. 4, a cryostat 40 in accordance with the invention includes a cold plate 42 having a plurality of wells 45 formed therein. A heater 44 and a temperature sensor 46 are attached to the base portion 48 of the cold plate 42 away from the openings to the wells 45.

The cold plate 42 is contained in a vacuum housing 50 of a double walled construction, as is well known in the cryostat art. Extremely low temperatures may be maintained in the housing 50 and in-leakage of thermal energy from all external sources is desired to be minimized.

A first thermal intercept 52, fabricated of a highly heat conducting material, e.g., copper, is set off by a distance 54 from the face 56 of the cold plate 42 wherein the wells 45 are formed. Associated with the first thermal intercept 52 is a temperature sensor 58 and a heat exchanger (not shown) connected to the lower surface 60 of the thermal intercept 52, whereby the temperature of the intercept 52 may be controlled as described hereinafter. A second thermal intercept 62 is spaced off from the first thermal intercept 52 by a distance 64 and has a temperature sensor 66 on its upper surface and a heat exchanger (not shown) on its lower surface 67, whereby the temperature of the second thermal intercept 62 may be controlled.

The top surface 68 of the vacuum housing 50 is closed in a conventional manner. Frequently, a heater is provided for a top cover so as to avoid condensation on the cover's outer surfaces.

Provision is made in the form of a inlet line 70 for providing a refrigerant, e.g., liquid helium, to a liquid receiver 72. From there, conduit 74 provides liquid refrigerant from the receiver 72 to the heat exchangers (not shown) connected to the first and second thermal intercepts 52, 62, respectively. The refrigerant absorbs heat from the intercepts 52, 62, boils and leaves the vacuum housing 50 through a flow control valve 76, which controls the rate of refrigerant flow to the thermal intercepts 52, 62 and thereby controls the amount of cooling that is effected in the cryostat 40.

In FIG. 4, devices 78 to be cooled are mounted in cassettes 80 that extend from the base of the well 45 to the top 68 of the housing 50 and are in thermal contact with the thermal intercepts 52, 62, where the cassettes 80 pass through the intercepts. It should be understood that the cassettes 80 and the devices 78, which are being cooled, are not novel parts of the present invention.

The housing for the cassette 80 is of a low thermal conductivity material so as to minimize the in-flow of heat from the top 68 of the cryostat 40 to the devices 78 being cooled. Any such flow is intercepted by the intercepts 62, 52, which are colder than the top surface 68 of the vacuum housing 50. Thus, little heat from that source is expected to reach the devices 78, which are cooled. Heat also enters through the walls of the vacuum housing 50. For this reason, the inner wall 82 of the vacuum housing 50 is made of material having low thermal conductivity and the housing is maintained with an internal vacuum in a known manner.

If it is assumed hypothetically, that (a) there is no in-leakage of heat through the vacuum housing 50, (b) the heater 44 is inoperative and (c) the devices 78 being cooled generate no heat from their operation, then it can be expected that the cold plate 42, and thermal intercepts 52, 62 will come to the temperature of the liquid refrigerant in the liquid receiver 72 when refrigerant flows from the receiver 72 through the heat exchangers (not shown) of the intercepts 52, 62 and exits from the refrigerant flow control valve 76.

However, in actual usage of the cryostat 40 in accordance with the invention, the heater 44 operates so that the cold plate 42 is always maintained at a temperature higher than the temperature of liquid refrigerant that enters and cools the first thermal intercept 52.

The second thermal intercept 62 is at a higher temperature than the first thermal intercept 52 as the refrigerant turns from liquid to gas and becomes superheated.

Thus, because of the temperature gradient that is produced between the operating heater 44 and the thermal intercept 52, heat tends to flow through the cold plate 42 from the heater 44 to the coldest surface, that is, the thermal intercept 52. The flow of refrigerant is controlled in response to the temperature sensor 58 and the output of the heater 44 is controlled such that a very small temperature differential is made to exist between the face 56 of the cold plate 42 and the thermal intercept 52. Because the cold plate 42 is made of a material having a very high thermal conductivity and because the flow of heat from the cold plate 42 is reduced substantially to a minimum by the small temperature differential, as stated, flow of heat from the heater through the cold plate 42 is very small.

As a consequence, there are very small temperature gradients in the cold plate 42 and a large number of wells 45 with their devices 78 may be maintained at substantially the same constant temperature.

A single heater 44 and controller, not shown, control and provide uniformity of temperature in association with the temperature sensor 46 for a large cold plate with many wells 45. Because the thermal intercepts 52, 62 are made of highly conductive material, these also will have substantially uniform temperatures throughout. The major temperature differential between the base portion 48 of the cold plate 42 and the first thermal intercept 52 occurs not in the cold plate 42 itself but in the gap between the cold plate 42 and the thermal intercept 52. Therefore, relatively large thermal gradients, if they exist within the lateral extent of the thermal intercept 52 have little effect on the temperature of the cold plate 42 and the devices 78 being cooled.

In constructing such a cryostat 40, the spacings 54, 64 between the cold plate 42 and the thermal intercepts 52, 62, the flow of refrigerant and the energy supplied by the heater 44 are adjusted so as to minimize the requirements for heat from the heater 44. Thus, the amount of liquid refrigerant, which is required to maintain the desired temperature for the devices 78 being cooled, is minimized. For a helium flow that substantially fixes the temperature of the thermal intercept 52 in response to the temperature sensor 66, the heater 44, operating in conjunction with the temperature sensor 46 and control circuits (not shown), maintains the devices 78 at the desired temperature. Refrigerant does not flow through the cold plate 42. Cooling is effected solely by radiation and conduction between the thermal intercept 52 and the cold plate 42 with its devices 78. The devices 78 are in good thermal contact with the cold plate 42.

The spaces 84 between the cassettes 80 are filled with an inert gas which may be the same as the refrigerant, e.g., helium. Also, to eliminate convection currents, the spaces 84 may also contain a porous medium, such as rock wool or an open cell foam. Reduction of the gas pressure in the void spaces 84 will also reduce convection when the gas pressure within those spaces is reduced within a selected pressure range. For example, the thermal conductivity of all gases drops below its value at atmospheric pressure after the pressure has been reduced to a value of about 0.01 Pa. Also, convection heat transfer is proportional to pressure. By reducing the pressure to 10 kPa, the convective loss is reduced by a factor of 10. Thus, for pressures between 0.01 Pa and 10 kPa, conduction heat transfer is good but convective heat transfer is poor. This is a generally desirable condition for maintaining the small differential temperature between the first thermal intercept 52 and the cold plate 42. Reduction in convective heat transfer permits operation of the cryostat 40 at any angular orientation.

Whereas FIG. 4 illustrates a construction having two thermal intercepts, the quantity of such thermal barriers is not limited to that quantity. In alternative embodiments in accordance with the invention, more than two thermal intercepts may be used.

In development of a cryostat in accordance with the invention using a helium refrigerant, three thermal intercepts have been considered in conjunction with a cold plate containing a large plurality of wells wherein detectors of the visible light photon counter type will be maintained at a constant temperature over extended periods, e.g., six months. To maintain a cold plate at 6.5 K., liquid helium at 4.2 K. is used as the refrigerant. The first (closest) thermal intercept is at 6.5 K., a second thermal intercept is at 30 K. and a third thermal intercept is at 90 K. The cold plate is made of copper of good thermal conductivity and has a thickness of two inches. The three thermal intercepts are of similar copper of approximately ⅜ inch thickness.

The first thermal intercept is located in the range of a ½ to ¾ of an inch from the cold plate and the second thermal barrier is in the order of two inches from the first thermal intercept, as is the third thermal intercept from the second thermal intercept. The distance from the top 68 of the cryostat to the cold plate is maximized within the constraints of a particular application. The cold plate and thermal intercepts are held in fixed relationship to each other by a structure made of a material having low thermal conductivity and attached to a cover for the vacuum housing 50. This structure may be fabricated, e.g., of G10, which is a glass reinforced plastic material having high strength and poor thermal conductivity. The housings for the cassettes 80 may be made of a similar G10 material.

Further, it should be noted that the helium flow control valve 76 can be positioned on the liquid helium input line 70. When the refrigerant is a subcooled liquid at the source, it is relatively easy to maintain a constant flow rate and thereby stable temperatures at the thermal intercepts. The refrigerant that circulates from the refrigerant source through the thermal intercepts is entirely isolated from any gas that may be used to fill the spaces 84 between the cassettes 80. Thus, the chances of contamination are reduced and the need for a complicated vacuum system is eliminated.

Figure 5:
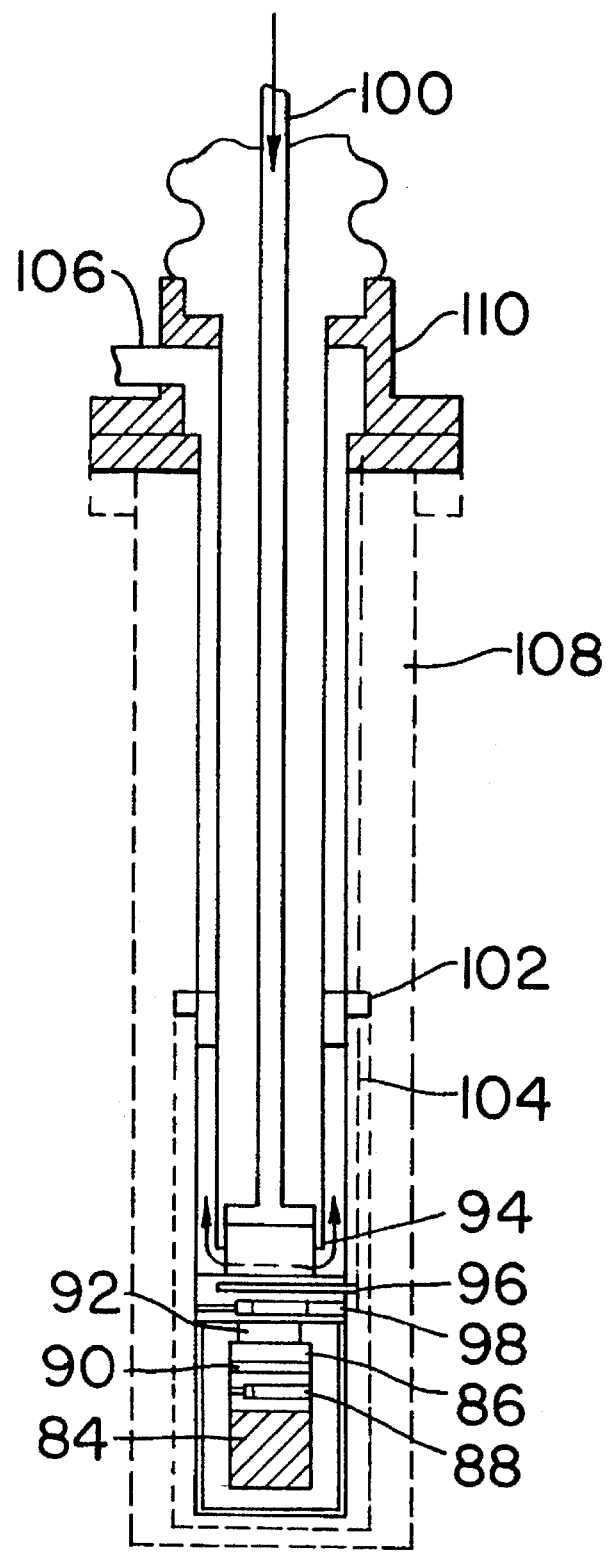
FIG. 5 is a schematic of an alternative embodiment in accordance with the invention of a cryostat for very stable temperature maintenance.

Conceptually, the principles that are employed in keeping multiple detectors or devices at a constant temperature can be applied to keeping only one or a few devices at a constant temperature. A construction for such an application in accordance with the invention is illustrated in FIG. 5, where a sample 84 is mounted on a cold plate 86 which has a temperature sensor 88 and heater 90 connected to a temperature controller (not shown). A weak thermal link 92, represented schematically in FIG. 5, separates the sample 84 from a first thermal intercept 94 having a heater 96 and temperature sensor 98 in close proximity such that the thermal intercept 94 is maintainable at a desired temperature slightly colder than that of the cold plate 86 by means of a flow of refrigerant through the central transport tube 100.

With controlled flow of refrigerant, the thermal intercept 94 may be held at, e.g., 5.5 K. while the cold plate 86 is maintained at 6.5 K.

In operation, a flow of refrigerant through the transfer line 100 cools the thermal intercept 94 and reverses path to flow upwardly to cool a second thermal intercept 102 and an associated radiation shield 104 in the housing 108 before it discharges, generally in gaseous state, from a refrigerant outlet port 106. The heater 96 and temperature sensor 98 operate in conjunction with a thermal controller (not shown) to maintain the thermal intercept 94 at the desired temperature while at the same time the heater 90 and temperature sensor 88 operate in conjunction with a thermal controller (not shown) to maintain the cold plate 86 at its desired temperature. The cold plate and thermal intercepts are maintained in the vacuum housing 108 having a cover 110 of a construction similar to that described above with regard to the embodiment of FIG. 4.

Cold plate temperature may be sensed using a silicon diode, and the cold plate may be heated by a cartridge heater, or two for enhanced reliability, inserted into the cold plate. Tubes carrying refrigerant may be thermally bonded, e.g. soldered, to the thermal intercepts to effect heat transfer.

Cryostat constructions may be provided, depending upon the devices to be cooled and the desired temperature, using different selected refrigerants, e.g. helium, nitrogen, hydrogen, neon, argon.

In both embodiments, the sample or device 84 to be cooled is not in direct heat transfer relationship with the flow of refrigerant. A small differential temperature between the cold plate and the first thermal intercept reduces heat transfer therebetween to a very low level such that the cold plate is at a substantially uniform temperature throughout. In each embodiment heat is applied to the cold plate and separately controlled. Cooling is applied to the thermal intercept and separately controlled; the cold plate is not directly cooled by the refrigerant. Positioning of the thermal intercepts relative to the cold plate and cover of the vacuum housing (FIG. 5) is determined to minimize the electrical heating requirements at the heaters 90, 96 and to reduce the flow of refrigerant.

It will thus be seen that the objects set forth above, and those made apparent from the preceding description, are efficiently attained, and, since certain changes may be made in the above constructions without departing from the spirit or the scope of the invention, it is intended that all matter contained in the above description, and shown in the accompanying drawings shall be interpreted as illustrative and not in a limiting sense.

What is claimed is:

1. A cryostat for maintaining devices to be cooled at a very stable temperature, comprising:

a thermally insulated sealed housing for enclosing said devices;

a cold plate within said housing, in use of said cryostat said devices being attached to said cold plate with a thermal bond therebetween;

a first heater associated with said cold plate;

a first temperature sensor associated with said cold plate for providing signals indicative of the cold plate temperature, said cold plate temperature being controllable using said signals to operate said first heater and maintain said cold plate at a first preselected temperature;

at least one thermal intercept in said housing, said at least one thermal intercept being spaced away from said cold plate, a first one of said at least one thermal intercept being proximate said cold plate;

cooling means for maintaining said first thermal intercept at a second preselected temperature, said first preselected temperature being higher than said second preselected temperature, whereby heat from said cold plate tends to flow towards said first thermal intercept.

2. A cryostat as in claim 1, wherein said cooling means provides a flow of cryogenic refrigerant to cool said first thermal intercept and said second preselected temperature is controlled by at least one of refrigerant flow rate control and a second heater and second temperature sensor associated with said first thermal intercept.

3. A cryostat as in claim 2, wherein heat output by said first heater in maintaining said first preselected temperature does not exceed 20% of an entire heat load from all sources on said first thermal intercept, said heat load from all sources including heat leakage through said housing.

4. A cryostat as in claim 2, wherein said refrigerant is helium.

5. A cryostat as in claim 2, wherein a temperature differential between said first preselected temperature and said second preselected temperature is in a range of approximately 0.5 K. to 5.0 K.

6. A cryostat as in claim 2, wherein there is a large plurality of said devices to be cooled attached to said cold plate, said devices being separated by interstitial spaces, said spaces being filled with one of gaseous helium and porous insulation, said gaseous helium being at a pressure between approximately 0.01 Pa and 10 kPa, whereby convective heat transfer in said cryostat is reduced and said cryostat is operable at any angular orientation.

7. A cryostat as in claim 2, wherein there is a large plurality of said devices attached to said cold plate, said devices being separated by interstitial spaces, said spaces being filled with a gas.

8. A cryostat as in claim 7, wherein said gas is helium.

9. A cryostat as in claim 2, wherein a temperature differential between said first preselected temperature and second preselected temperature is in a range of approximately 0.5 K to 25.0 K.

10. A cryostat as in claim 2, wherein there are more than one thermal intercepts and the respective temperatures of said thermal intercepts increase as the spacings of said thermal intercepts from said cold plate increases, each of said thermal intercepts being cooled by said cooling means.

11. A cryostat as in claim 10, wherein said refrigerant cools said thermal intercepts in series beginning at said first thermal intercept.

12. A cryostat as in claim 10, wherein said refrigerant is supplied to said first thermal intercept as one of a gas and a liquid.

13. A cryostat as in claim 2, wherein said refrigerant flows directly in contact with said first thermal intercept.

14. A cryostat as in claim 1, wherein said cooling means operates with a cryogenic refrigerant.

15. A cryostat as in claim 1, wherein said thermal bond is highly conductive.

16. A cryostat as in claim 15, wherein said thermal bond would result from contact between said devices and said cold plate.

* * * * *